United States Patent Office 3,784,647
Patented Jan. 8, 1974

3,784,647
CURING EPOXIDE RESIN WITH BORON
TRICHLORIDE-AMINE COMPLEX
George Latto Fleming, Saffron Walden, and Richard John Martin, Linton, England, assignors to Ciba-Geigy AG, Basel, Switzerland
No Drawing. Filed Aug. 9, 1971, Ser. No. 170,388
Claims priority, application Great Britain, Aug. 11, 1970, 38,647/70
Int. Cl. C08g 45/06
U.S. Cl. 260—830 TW         9 Claims

ABSTRACT OF THE DISCLOSURE

Curable compositions comprise an epoxide resin and a complex of formula $BCl_3 \cdot NR^4R^5R^6$ where $R^4$, $R^5$ and $R^6$ together with the nitrogen atom form a heterocyclic ring, or $R^4$ and $R^5$ both represent methyl groups and $R^6$ denotes an alkyl or aralkyl group of at least 6 and at most 18 carbon atoms.

Preferred compositions contain complexes in which $NR^4R^5R^6$ denotes pyridine, and those in which $R^6$ denotes an alkyl hydrocarbon group of 6–18 carbon atoms or a benzyl group.

The complexes act as latent hardeners.

---

This invention relates to curable epoxide resin compositions and to the products obtained by curing such compositions.

It is known that epoxide resins, i.e. substances containing on average more than one 1,2-epoxide group per molecule, may be cured, i.e. hardened, on reaction with various classes of substances to form products having valuable technical properties. With one class of curing agents, such as the alkylene polyamines, application of heat is usually unnecessary. With a second class, the so-called heat-curing agents, it is necessary to apply heat so that cross-linking is substantially complete within a conveniently short time. Representative of this second class are polycarboxylic acids and their anhydrides, aromatic polyamines, polycarboxylic acid polyhydrazides, and dicyandiamide.

There is a demand for "latent" curing agents, i.e. substances which are substantially inert towards the epoxide resin at room temperature (thus permitting the resin and curing agent to be stored as a "one part" composition for prolonged periods), and also at moderate temperatures, say 40° C., so that the "pot-life" is reasonably long, yet which, at curing temperatures, effect rapid cross-linking. Several types of latent curing agent have been suggested, but those hitherto available have proved in practice not to fulfill all the requirements. Some are insufficiently latent, reacting with the resin at room temperature to an extent that the shelf-lives of the mixtures of resin and curing agent are too short. Others, while not reacting to any appreciable extent with the resin at room temperature, effect curing on heating so slowly as to require inconveniently long curing times. Yet others have further disadvantages, e.g. the mixture of curing agent and resin is too sensitive to moisture, or the electrical properties of the cured resin are poor.

Recently, it has been proposed (U.S. Pat. No. 3,395,121) to use as curing agents certain complexes of boron trichloride with tertiary amins, viz. complexes formed with amines of formula

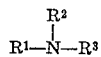

where $R^1$, $R^2$ and $R^3$ are alkyl groups containing from 1 to 4 carbon atoms. Mixtures of epoxide resins with such complexes are said to have exceptionally long pot-lives at elevated temperature, relatively short curing times at curing temperatures, long storage-life, and relatively high hydrolytic stability. The use of boron trichloride-trimethylamine complex, and its advantages over a known curing agent, boron trifluoride-monoethylamine, are described in detail. This patent adds that boron trichloride-triethylamine had also been evaluated, and had substantially similar properties.

Unpublished experiments by the applicants have shown, however, that the boron trichloride-triethylamine complex behaved quite differently from the trimethylamine complex, and was not latent to an appreciable extent.

Thus, boron trichloride-triethylamine complex was prepared from dry triethylamine (40 g.) and boron trichloride (42 g.) in n-pentane. The reactants were combined at −78° C. under nitrogen and the reaction mixture was allowed to warm to room temperature. The buff-coloured precipitate was recrystallised from ethanol to give white crystals of the complex melting at 90° C. and having the following elemental analysis: C, 33.0%; H, 6.9%; N, 6.4%; $C_6H_{15}N.BCl_3$ requires C, 33.0%; H, 6.9%; N, 6.4%.

In contrast to the trimethylamine-boron trichloride complex prepared as described in U.S. Pat. No. 3,395,121, the triethylamine complex was found to be hygroscopic.

The following comparative tests were carried out.

(a) Samples of boron trichloride-trimethylamine and -triethylamine complexes were added to a solvent-free liquid polyglycidyl ether of 2,2-bis(4-hydroxyphenyl)propane, having an epoxide content of 5.0 to 5.2 equivalents per kilogram, so that the complex content was 3 parts per 100 parts of resin. The mixtures were stored at 40° C. The mixture containing the triethylamine complex had gelled after 3 weeks whereas that containing the trimethylamine complex was still ungelled after 9 months.

(b) Samples were mixed with the same epoxide resin and the gel times were measured at various temperatures. The results were as follows:

|  | Gel times in minutes at— | | | | |
| --- | --- | --- | --- | --- | --- |
|  | 130° C. | 120° C. | 110° C. | 100° C. | 80° C. |
| $BCl_3$.trimethylamine | 36 | 118 | 374 | 1,086 |  |
| $BCl_3$.triethylamine |  | 21 |  | 40 | 165 |

These results show that whilst there is a marked transition in gel times for the trimethylamine complex between 100° and 130° C., the triethylamine complex does not show such a transition in properties. Therefore, the triethylamine complex cannot be classed as a latent hardener, whereas the trimethylamine complex is clearly latent.

Other complexes of boron trichloride examined by the applicants and found not to be latent included those formed with N-benzyldiethylamine and N,N-dimethylcyclohexylamine.

Hence, it was not obvious to those skilled in the art that complexes of boron trichloride with certain other tertiary amines would be useful latent curing agents. Surprisingly, it has been found that complexes with certain heterocyclic, araliphatic, and higher alkyl tertiary amines do behave as curing agents with a very high degree of latency.

The present invention accordingly provides curable compositions comprising: (1) an epoxide resin, and (2) a complex of formula $$BCl_3 \cdot NR^4R^5R^6$$

wherein $R^4$, $R^5$, and $R^6$, together with the indicated nitrogen atom, represent a 5- or 6-membered heterocyclic ring which may be substituted by a lower alkyl group containing 1–4 carbon atoms, or $R^4$ and $R^5$ both represent methyl groups and $R^6$ denotes an alkyl or aralkyl group of at least 6 and at most 18 carbon atoms.

The preferred complexes are those in which $R^4$, $R^5$, and $R^6$, together with the indicated nitrogen atom, denote pyridine, and those in which $R^6$ denotes either an alkyl hydrocarbon group of at least 6 and at most 18 carbon atoms or a benzyl group. The complex with pyridine is known (see Bax et al., J. Chem. Soc., 1958, 1254): the other preferred complexes are believed to be new.

Epoxide resins which may be employed in these compositions are in general those containing terminal groups of formula

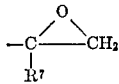

where $R^7$ denotes a hydrogen atom or a methyl group, particularly as 2,3-epoxypropyl groups directly attached to oxygen, nitrogen or sulphur atoms.

As examples of such resins may be mentioned polyglycidyl and poly($\beta$-methylglycidyl) esters obtainable by reaction of a compound containing two or more free carboxyl groups per molecule with epichlorhydrin, glycerol dichlorohydrin, or $\beta$-methylepichlorohydrin in the presence of an alkali. Such polyglycidyl esters may be derived from aliphatic polycarboxylic acids, e.g. oxalic acid, succinic acid, glutaric acid, adipic acid, pimelic acid, suberic acid, azelaic acid, sebacic acid, and dimerized or trimerized linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly($\beta$-methylglycidyl) ethers obtainable by reaction of a compound containing at least two free alcoholic hydroxyl and/or phenolic hydroxyl groups per molecule with the appropriate epichlorohydrin or glycerol dichlorohydrin under alkaline conditions or, alternatively, in the presence of an acidic catalyst and subsequent treatment with alkali. These ethers may be derived from acyclic alcohols such as ethylene glycol, diethylene glycol, triethylene glycol, and higher polyoxyethylene glycols, propane-1,2-diol and polyoxypropylene glycols, propane-1,3-diol, butane-1,4-diol, polyoxybutylene glycols, pentane-1,5-diol, hexane-1,6-diol, hexane-2,4,6-triol, glycerol, 1,1,1-trimethylolpropane, pentaerythritol, or poly(epichlorohydrin); from cycloaliphatic alcohols such as resorcitol, quinitol, bis(4-hydroxycyclohexyl)methane, 2,2-bis(hydroxycyclohexyl) propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamino)diphenylmethane. Or they may be derived from mononuclear phenols, such as resorcinol and hydroquinone, and polynuclear phenols, such as bis(4-hydroxyphenyl)methane, bis(4-hydroxyphenyl) sulphone, 1,1,2,2-tetrakis(4-hydroxyphenyl) ethane, 2,2-bis(4-hydroxyphenyl) propane (otherwise known as bisphenol A), 2,2-bis(3,5-dibromo-4-hydroxyphenyl)propane, and novolaks formed from aldehydes such as formaldehyde, acetaldehyde, chloral, or furfuraldehyde, with phenols such as phenol itself, and phenol substituted in the ring by chlorine atoms or by alkyl groups each containing up to eight carbon atoms, such as 4-chlorophenol, 2-methylphenol, and 4-tert.butylphenol.

Poly(N-glycidyl) compounds include, for example, those obtained by dehydrochlorination of the reaction products of epichlorohydrin with amines containing at least two amino-hydrogen atoms such as aniline, n-butylamine, bis(4-aminophenyl)methane, or bis(4 - methylaminophenyl)methane; triglycidyl isocyanurate; and N,N'-diglycidyl derivatives of cyclic ureas such as ethyleneurea or 1,3-propylene urea and hydantoins such as 5,5-dimethylhydantoin.

Examples of poly(S-glycidyl) compounds are di-S-glycidyl derivatives of dithiols such as ethane-1,2-dithiol and bis(4-mercaptomethylphenyl ether.

Epoxide resins having terminal 1,2-epoxide groups attached to different kinds of hetero atoms may be employed, e.g. the N,N,O-triglycidyl derivative of p-aminophenol, or glycidyl ether-glycidyl esters of salicylic acid or phenolphthalein.

If desired, a mixture of epoxide resins may be used.

The curing agents of this invention are particularly useful when employed with polyglycidyl ethers of polyhydric phenols; especially suitable resins are polyglycidyl ethers of 2,2-bis(4-hydroxyphenyl)propane or of a novolak formed from formaldehyde and phenol, or phenol substituted in the ring by one chlorine atom or by one alkyl hydrocarbon group containing from one to eight carbon atoms, and having an epoxide content of more than about 0.5 1,2-epoxide equivalent per kilogram.

The curing agents of the present invention need not be used alone but may, if desired, be used in admixture with other known curing agents for epoxide resins, such as polycarboxylic acids and their anhydrides, and amines.

The proportion of curing agent to be used will depend on such factors as the epoxide content of the epoxide resin used, the nature of the curing agent, and the curing conditions to be employed. The proportion required may be readily determined by routine experimentation but, by way of illustration, from about 0.1 to 10, and especially about 1 to 5, parts by weight of the curing agent may be used per 100 parts by weight of the epoxide resin.

The new compositions may further contain suitable plasticizers such as dibutyl phthalate, dioctyl phthalate or tricresyl phosphate, inert diluents, and so-called reactive diluents, such as furfuryl alcohol and especially monoepoxides, for example, butyl glycidyl ether, iso-octyl glycidyl ether, phenyl glycidyl ether, or glycidyl esters of synthetic, highly branched, predominantly tertiary, aliphatic monocarboxylic acids. They may also contain additives such as fillers, reinforcing materials, colouring matter, flow control agents, flame inhibitors, mould lubricants, and the like. Suitable extenders, fillers and reinforcing materials are, for example, asphalt, bitumen, glass fibres, carbon fibres, mica, quartz flour, cellulose, kaolin, wollastonite, colloidal silica having a large specific surface, e.g. that available under the registered trademark "Aerosil," powdered poly(vinyl chloride) or powdered polyolefin hydrocarbons.

The curable compositions of this invention may be used as laminating resins, paints and lacquers, sinter powders, impregnating and casting resins, moulding compositions, hot-curing putties and sealing compounds, potting and insulating compounds for the electrical industry, and adhesives, and also in the manufacture of such products.

The following examples illustrate the invention. Unless otherwise specified, parts are by weight. Infusibility times were determined by placing a sample of the composition on a surface maintained at the test temperature shown: at intervals, small portions of the sample were removed and checked for fusibility by placing them on a surface at 250° C. The duration of heating required at the test temperature to render the sample infusible was noted as the infusibility time.

"Epoxide resin I" denotes a polyglycidyl ether of 2,2-bis(4-hydroxyphenyl)propane, having a 1,2-epoxide content of 5.16 equivalents per kilogram and a viscosity at 21° C. of 245 poises.

"Epoxide resin II" denotes a polyglycidyl ether of a phenol novolak resin, having a 1,2-epoxide content of 5.45 equivalents per kilogram, and a softening point of 35° C.

"Epoxide resin III" denotes a solid polyglycidyl ether of 2,2-bis(4-hydroxyphenyl)propane, having a 1,2-epoxide content of 1.97 equivalents per kilogram.

"Epoxide resin IV" denotes a polyglycidyl ether of butane-1,4-diol, having a 1,2-epoxide content of 8.85 equivalents per kilogram.

"Epoxide resin V" denotes an adduct resin prepared by heating for 2 hours at 120° C. (a) 100 parts of a polyglycidyl tetrahydrophthalate, having a 1,2-epoxide content of 6.35 equivalents per kilogram, and (b) 50 parts of an acid-terminated polyester prepared from adipic acid (8 moles), insophthalic acid (2.8 moles) and propane-1,2-diol (9.8 moles); having an acid content of 1.49 equivalents per kilogram. Thus prepared, Epoxide resin V had a 1,2-epoxide content of 4.05 equivalents per kilogram and a viscosity of 130 poises at 25° C.

"Epoxide resin VI" denotes the tetrakis(N-glycidyl) derivative of bis(4-aminophenyl)methane having a 1,2-epoxide content of 8.2 equivalents per kilogram.

Boron trichloride-N-benzyldimethylamine complex was prepared as follows.

Dry benzyldimethylamine (125 g.) was stirred at 0° C. in dry benzene in an atmosphere of nitrogen. Boron trichloride (108 g.) in dry benzene was added slowly. On the addition being completed, the mixture was stirred for 3 hours at 0° C., then the precipitated solid was recrystallized from ethanol and dried to give white crystals of boron trichloride-benzyldimethylamine complex (143 g.), M.P. 131° C. The product had the analysis: C, 42.14%; H, 4.97%; N, 5.55%. $C_9H_{13}N.BCl_3$ requires C, 42.81%; H, 4.96%; N, 5.34%. This product is hereinafter referred to as "Complex A."

Boron trichloride-octyldimethylamine complex was prepared as follows:

"Empigen 5015" (a commercial mixture of n-alkyldimethylamines in which n-octyldimethylamine predominates) (120 g.) was stirred in an atmosphere of nitrogen at 30 to 40° C. whilst boron trichloride (87 g. was slowly bubbled through the mixture. A brown crude product was obtained which, on recrystallization from ethanol, gave white crystals of boron trichlorideoctyldimethylamine complex (84.9 g.), M.P. 28° C. The product had the elemental analysis: C, 44.05%; H, 8.48%; N, 5.10%. $C_{10}H_{23}N.BCl_3$ requires C, 43.74%; H, 8.38%; N, 5.10%. This product is hereinafter referred to as "Complex B."

Boron trichloride-pyridine complex was prepared as follows:

Boron trichloride (72 g.) was bubbled through dry pyridine (49 g.) in benzene at 0° C. in an atmosphere of nitrogen. On completing the addition, the mixture was stirred for 3 hours at 0° C. The precipitated white solid was recrystallized from ethanol and dried to give boron trichloride-pyridine complex (118 g.), M.P. 114° C. Elemental analysis gave the results: C, 30.05%; H, 2.38%; N, 6.91%. $C_5H_5N.BCl_3$ requires C, 30.56%; H, 2.55%; N, 7.13%. This product is hereinafter referred to as "Complex C."

EXAMPLE 1

Complexes A, B and C were mixed with samples of Epoxide resin I in the proportion of 3 to 5 parts per 100 parts of the resin. For comparative purposes, a known latent hardener, boron trifluoride-ethylamine complex, was mixed with a sample of Epoxide resin I in the proportion of 3 parts per 100 parts of the resin.

Viscosity measurements were taken of all samples over a period at 21° C. and at 40° C. The results are given in Table I.

TABLE I

|  | Hardener | | | | |
|---|---|---|---|---|---|
|  | $BF_3.C_2H_5NH_2$ | Comple A | | Complex B | Complex C |
|  | Amount (parts per 100 of resin) | | | | |
|  | 3 | 3 | 5 | 3 | 5 | 4 |
| Initial viscosity at 21° C. (poises) | 760 | 275 | 275 | 215 | 185 | 245 |
| Time taken to double initial viscosity at 21° C. (weeks) | 6 | >17 | >17 | >17 | >17 | 14 |
| Viscosity after 8 weeks at 21° C. (poises) | 2,200 | 270 | 317 | 250 | 225 | 322 |
| Initial viscosity at 40° C. (poises) | 55 | 24 | 23 | 20 | 17 | 22 |
| Time taken to double initial viscosity at 40° C. (weeks) | 1 | 9 | 6.7 | 17 | 17 | 4 |

The results show that the mixtures containing Complexes A, B, and C were much slower to cure at 21° C. and 40° C. than that containing the boron trifluoride-ethylamine complex: pot-lives of such mixtures would therefore be much longer.

EXAMPLE 2

Complexes A, B, and C were mixed with Epoxide resin I as described in Example 1 and the deflection temperatures under load (D.T.L.) were measured for the cured samples in accordance with British Standard 2782, Method 102G. The results are given in Table II.

TABLE II

| D.T.L. after cure cycle indicated, hours at— | | | Hardener | | | | |
|---|---|---|---|---|---|---|---|
|  |  |  | $BF_3.C_2H_5NH_2$ | Complex A | | Complex B | Complex C |
|  |  |  | Amount (parts per 100 of resin) | | | | |
| 120° | 150° | 190° | 3 | 3 | 5 | 3 | 5 | 3 |
| A | ½ | 0 | 6 | (¹) | | | 58 | |
| B | 2 | 1 | 0 | 98 | 90 | 112 | 88 | 108 | 104 |
| C | 2 | 6 | 2 | 156 | 137 | 135 | 130 | 128 | 132 |
| D | 2 | 6 | 336 | 130 | 138 | 128 | 136 | 129 | 120 |

¹ Still liquid.

These results show that a more rapid rate of cure can be obtained with Complex B than with $BF_3$-ethylamine complex at 120° C., despite the longer pot life of the former system (Table I). Further, although the $BF_3$ complex gives a higher D.T.L. than the $BCl_3$ complexes after the exhaustive cure (schedule "C"), after heat-ageing (schedule "D") this advantage is lost.

EXAMPLE 3

The mixtures described in Example 1 were tested according to British Standard 2782, Method 205D for power factor, tan δ, at 50 Hz. and method 206D for tan δ, at 1 kHz. The results are given in Table III.

TABLE III

| | Hardner | | | | |
|---|---|---|---|---|---|
| | $BF_3 \cdot C_2H_5NH_2$ | Complex A | | Complex B | Complex C |
| | Amount (parts per 100 of resin) | | | | |
| | 3 | 3 | 5 | 3 | 5 | 3 |
| Power factor (tan δ) at 50 Hz. and 110° C. after a cure at 120° C. of— | | | | | | |
| 3 hours | >0.1 | | | 0.028 | | |
| 8 hours | >0.1 | | | 0.014 | | 0.013 |
| 16 hours | >0.1 | 0.039 | 0.042 | | | |
| Power factor (tan δ) at 1 kHz. and 160° C. after a cure of— | | | | | | |
| 2 hours at 120° C. plus | | | | | | |
| 6 hours at 150° C. plus | 0.078 | 0.018 | 0.040 | 0.012 | 0.043 | 0.018 |
| 2 hours at 190° C. | | | | | | |

The superiority of the mixtures containing Complexes A, B, and C in respect of power factor-temperature characteristics is clearly demonstrated by the above results. The rapid rate of cure noted in Example 2 with 5% of Complex B is further reflected in the low power factor of the specimen cured at 120° C. for 3 hours.

EXAMPLE 4

A composition suitable for pre-impregnating glasscloth or mica-tape was prepared by mixing a solution of Epoxide resin II (100 parts), acetone (25 parts), Complex B (5 parts), and toluene (5 parts). The viscosity of this solution was determined when freshly prepared and after storage for 8 weeks at 40° C. During this period the viscosity rose from 0.84 poise to 1.00 poise. After storage, the solvent was removed at 100° C. under vacuum and tests were carried out on the distillate and the residual resin-hardener mixture.

The ultraviolet spectrum of the solvent showed complete absence of phorone, demonstrating that, unlike boron trifluoride-ethylamine complex, Complex B does not catalyze acetone-condensation reactions.

The residual resin hardener mixture was compared with the equivalent material obtained from the unaged solution. The results are shown in Table IV.

TABLE IV

| | Source of resin hardener mixture | |
|---|---|---|
| | Freshly prepared solution | Solution aged 8 weeks at 40° C. |
| Gelation time at 154° | 1.5 | 1.6 |
| Deflection temperature under load (BS 2782, Method 102G) after a cure of 16 hours at 155° C. plus 2 hours at 190° C. | 156° C. | 167° C. |
| Temperature at which tan δ=0.05 (cure as above) | 142° C. | 141° C. |

It is clear from the above results that the resin hardener mixture is storage stable at 40° C. even in acetone solution: similar compositions in which boron trifluoride complex hardeners are used are, however, not storage-stable.

EXAMPLE 5

A mixture of Epoxide resin III (60 parts), Epoxide resin IV (40 parts), and Complex B (3 parts) was prepared by heating and stirring the two resins at 120° C., then cooling to 40° C. and mixing in the Complex B.

The composition obtained showed no significant change of viscosity after storage at 40° C. for 1 month, but cured almost completely after heating for 4 hours at 135° C. The cured product was flexible, had an excellent shock resistance, and had a high impact strength. The impact strength, determined in accordance with British Standard 2782 Method 306A, was 1.5 ft.-lbf. (metric equivalent 0.2 m.-kgf.). The product showed good retention of flexibility on heat ageing at 150° C.

EXAMPLE 6

Epoxide resin V (100 parts) was mixed with Complex B (3 parts). The composition showed no significant change of viscosity after storage at 40° C. for 1 month, but cured almost completely within 2 hours at 120° C. The cured product was tough and flexible, and had good thermal shock resistance.

EXAMPLE 7

This example demonstrates the higher reactivity of Complex B compared with boron trichloride-trimethylamine complex.

Epoxy resin I (100 parts) was mixed with $BCl_3$-trimethylamine complex (3 parts) and with Complex B (3 parts). These compositions, both of which contain the same molar proportion of $BCl_3$-complex, were compared for stability at 40° C. and reactivity at 90°–120° C. The results are shown in Table V.

TABLE V

| Composition, parts by weight: | | |
|---|---|---|
| Epoxy resin I | 100 | 100 |
| $BCl_3$-trimethylamine | 2 | |
| Complex B | | 3 |
| Initial viscosity at 40° C., p | 21 | 20 |
| Viscosity (at 40° C.) after 8 weeks at 40° C., p | 24.8 | 24 |
| Gelation time in minutes at— | | |
| 90° C. | 3,740 | 608 |
| 105° C. | 581 | 169 |
| 120° C. | 118 | 34 |

It is evident from Table V that whilst both $BCl_3$-trimethylamine and $BCl_3$-octyldimethylamine give adequate stability at 40° C., the latter complex produces substantially faster cure at 90°–120° C.

EXAMPLE 8

Complex B was mixed with a sample of Epoxide resin VI in the proportion 5 parts per 100 parts of resin, and the deflection temperature under load (D.T.L.) was measured for the cured samples in accordance with British Standard 2782, Method 102G. A sample cured at 135° C. for 2 hours had a D.T.L. of 85° C., and a sample cured at 135° C. for 2 hours, followed by 190° C. for 2 hours, had a D.T.L. of 191° C.

What is claimed is:
1. A curable composition comprising:
   (1) an epoxide resin containing on average more than one 1,2-epoxide group per molecule, and
   (2) a curing amount of a complex of formula

$$BCl_3NR^4R^5R^6$$

where $R^4$ and $R^5$ each denote a methyl group and $R^6$ denotes a group having at least 6 and at most 18 carbon atoms and is selected from the class consisting of alkyl groups and aralkyl groups.

2. A composition according to claim 1, in which $R^6$ denotes a group selected from the class consisting of alkyl hydrocarbon groups and benzyl groups.

3. A curable composition comprising:
   (1) an epoxide resin containing on average more than one 1,2-epoxide group per molecule, and
   (2) a curing amount of a complex of formula $$BCl_3NR^4R^5R^6$$

where $R^4$, $R^5$, and $R^6$, together with the indicated nitrogen atom, represent a heterocyclic ring selected from the class consisting of mononuclear heterocyclic rings containing at least 5 and at most 6 members in the ring and mononuclear heterocyclic rings containing at least 5 and at most 6 members in the ring and substituted in the ring by an alkyl group of not more than 4 carbon atoms.

4. A composition according to claim 3, in which $NR^4R^5R^6$ denotes pyridine.

5. A composition according to claim 1, in which the Epoxide resin (I) contains groups of the formula

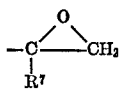

where $R^7$ is a substituent selected from the class consisting of hydrogen atoms and methyl groups.

6. A composition according to claim 5, in which the epoxide resin contains 2,3-epoxypropyl groups directly attached to heteroatoms selected from the class consisting of oxygen, nitrogen, and sulphur atoms.

7. A composition according to claim 3, in which the Epoxide resin (I) contains groups of the formula

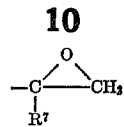

where $R^7$ is a substituent selected from the class consisting of hydrogen atoms and methyl groups.

8. A composition according to claim 7, in which the epoxide resin contains 2,3-epoxypropyl groups directly attached to heteroatoms selected from the class consisting of oxygen, nitrogen, and sulphur atoms.

9. The heat-cured product of the composition of claim 1.

References Cited
UNITED STATES PATENTS

| | | | |
|---|---|---|---|
| 3,395,121 | 7/1968 | Pfann et al. | 260—47 |
| 2,824,083 | 2/1958 | Parry | 260—47 |

WILLIAM H. SHORT, Primary Examiner

T. PERTILLA, Assistant Examiner

U.S. Cl. X.R.

117—124 E; 161—184; 260—2 N, 9, 30.4 EP, 28, 30.6 R, 31.8 E, 37 EP, 47 EN, 59, 75 EP, 77.5 NC, 78.4 EP, 79, 836